(12) United States Patent
Park

(10) Patent No.: US 7,329,964 B2
(45) Date of Patent: Feb. 12, 2008

(54) COMPACT HYDROPOWER GENERATOR ADOPTING MULTIPLE ROTARY DRUMS

(76) Inventor: Jae-Hong Park, 105-1704, Naegok Hyundai Apts., 469 Naegok-Dong, Gangneung-Si, Gangwon-Do (KR) 210-160

( * ) Notice: Subject to any disclaimer, the term of this patent is extended or adjusted under 35 U.S.C. 154(b) by 93 days.

(21) Appl. No.: 11/359,980

(22) Filed: Feb. 21, 2006

(65) Prior Publication Data
US 2006/0202482 A1    Sep. 14, 2006

(30) Foreign Application Priority Data
Mar. 10, 2005   (KR) .................. 10-2005-0020251
Oct. 26, 2005   (KR) .................. 10-2005-0101477

(51) Int. Cl.
*F03B 13/04* (2006.01)
(52) U.S. Cl. ............................................. 290/54
(58) Field of Classification Search ............ 290/54
See application file for complete search history.

(56) References Cited

U.S. PATENT DOCUMENTS

| 921,687 | A | * | 5/1909 | Flynn ......................... 405/75 |
| 928,782 | A | * | 7/1909 | Morrison .................... 416/177 |
| 4,317,330 | A | * | 3/1982 | Brankovics .................. 60/398 |
| 4,717,831 | A | * | 1/1988 | Kikuchi ........................ 290/53 |
| 6,357,997 | B1 | * | 3/2002 | Rosefsky ...................... 415/60 |
| 7,044,711 | B2 | * | 5/2006 | Duncan, Jr. ............. 416/198 R |
| 7,084,521 | B1 | * | 8/2006 | Martin ......................... 294/54 |

FOREIGN PATENT DOCUMENTS

DE    3542096 A1 * 10/1987
JP    55040240 A  *  3/1980

* cited by examiner

Primary Examiner—Joseph Waks
(74) Attorney, Agent, or Firm—GWiPS

(57) ABSTRACT

A compact hydropower generator adopting multiple rotary drums comprises a water reservoir for changing the flow direction of water that flows along a river and for temporarily storing the water. A base body is located at a lower side of the water reservoir and has a drainage way formed at an end of a downwardly inclined portion thereof. An upper closing member and a lower closing member are provided at opposite sides of an upper end of the base body. The upper closing member is configured to communicate with the water reservoir, and the lower closing member is configured to communicate with the drainage way through a plurality of drain pipes. A power generating unit is located between the upper and lower closing member. When the water stored in the water reservoir is introduced thereinto through a plurality of water supply pipes, the power generating device rotates about a plurality of shafts due to the potential energy of the water to obtain power. An accelerator and a generator are coupled to the lower ends of the shafts.

17 Claims, 8 Drawing Sheets

COMPACT HYDROPOWER GENERATOR ADOPTING MULTIPLE ROTARY DRUMS

BACKGROUND OF THE INVENTION

1. Field of the Invention

The present invention relates to a compact hydropower generating apparatus adopting multiple rotary drums, and more particularly, to a compact hydropower generation system having the following advantages: small-sized power generation utilizing a small river; easy installation of a small-scale nonpolluting hydroelectric power plant around the small river wherever there is a gentle gradient while achieving a minimum effect on the ecosystem of the small river; an efficient utilization of installation space with minimum environmental disruption; a considerable reduction in use of fossil fuel and energy; and an improvement in product quality and reliability.

2. Description of the Related Art

For countries suffering from a serious shortage of energy sources and showing a high degree of dependence upon imported energy, it is important to achieve maximum use of existing domestic energy sources for the stabilization of the energy supply. Furthermore, in order to effectively deal with a worldwide restriction due to global warming, it is essential to develop clean energy to bring about an improvement in percentage of energy independence. Nowadays, a compact hydropower resource is highly regarded when compared to other alternative energy resources since it has a high energy density. In Korea, to facilitate the utilization and development of compact hydropower, it is already possible to invest private capital in the development of compact hydropower plants based on the "compact hydropower development plan" (established in 1982). As a result of such positive governmental support, over thirty compact hydropower plants, each having a capacity of approximately 43 MW, had already been developed by the end of October 2003, and thus, approximately 100 GWh of electricity can be generated a year. However, the above mentioned capacity is only about 3.0% of the potential amount. Accordingly, to expand the utilization of small-sized hydropower energy, multilateral efforts—for example, development of related technologies, increased governmental support, promotion of related industries, and changes in understanding of the people—are necessary.

In Korea, "small hydropower generation" is newly defined as hydroelectric power generation of less than 10 MW based on an amendment of the Alternative Energy Development Promotion Act established at the end of 2002 by the Korean government. Small hydropower energy has several advantages in that it is a clean existing resource that is commercially available within a construction period of one year and it has an extremely small effect on the ecosystem and environment. Additional advantages of small-scale hydropower are that it can reduce damage to water quality upstream that is caused by the installation of dams or reservoirs, and it is an important energy resource capable of achieving a significant energy generation capability within a short time as compared to other alternative energy sources. Moreover, in the case of Korea, such systems achieve a localization of more than 90%. For these reasons, the Korean government set up a long-term plan for Alternative Energy Technology Development and Supply in July 2003, and is focusing on constructing new compact hydropower plants having a total combined capacity of 500 MW by 2013.

In particular, the development of compact hydropower is suitable for countries having a high annual precipitation and extensive mountainous regions. Thus, it can be said that, in these countries, by increasing the localization ratio of systems including turbine generators and lowering manufacturing costs thereof, they have infinite possibilities in development of compact hydropower generation.

FIG. 1 shows an example of a conventional compact hydropower generation apparatus. This conventional compact hydropower generation apparatus is disclosed in Korean Patent Application No. 2003-38596 (Korean Patent Publication No. 10-2004-107916), which is entitled "SMALL HYDROPOWER GENERATION APPARATUS AND TURBINE FOR THE SAME".

As shown in FIG. 1, the conventional small-sized hydropower generating apparatus comprises: a plurality of concrete props 10, each having an anchor bolt 12 vertically mounted therein to protrude upward, the concrete props 10 being arranged at appropriate locations determined in consideration of the geographical features of the installation site of the apparatus; a base frame 20 having an approximately plate shape and formed with a plurality of fastening holes 22 for the penetration and fixation of the anchor bolts 12; a plurality of posts 30 assembled on one side region of the base frame 20 by bolting; a turbine supported by the posts 30 by interposing bearings 32 on the posts 30, the turbine having a plurality of rotary blades 42 and which is rotated by flowing water that drops from an inlet opening 82; a supporting frame 50 assembled on the other side region of the base frame 20 by bolting; a gear box 60 assembled on the supporting frame 50 by bolting while being connected to a rotating shaft 46 of the turbine; a generator 70 assembled on the supporting frame 50 by bolting and connected to the gear box 60 by interposing a coupling 72, the generator 70 having a power transducer 74 electrically connected to a rear end thereof, and a case 80 separately assembled on the base frame 20 and having the inlet opening 82 formed at the top thereof and an outlet opening 84 to discharge the water dropping from the turbine. Not explained reference numerals 41, 43, 43a, and 87 designate a bottom plate, a facing plate, an opening, and a door, respectively.

The above described compact hydropower generation apparatus is designed to be installed near a small river, to be operated by use of flowing water having relatively low available head. In particular, the conventional apparatus has a prefabricated structure, and therefore, can be adapted for installation in many situations and exhibits an improved convenience in installation work.

However, the conventional small-sized hydropower generation apparatus has a severe problem in that it cannot secure an essential water intake source around the small river, and suffers from a structural limit in that it cannot transmit a large amount of power to the generator. For these reasons, the conventional small hydropower generation apparatus tends to fail to generate sufficient power.

SUMMARY OF THE INVENTION

Therefore, the present invention has been made in view of the above problems, and it is a first object of the present invention to provide a compact hydropower generation apparatus using multiple rotary drums, which enables small-scale power generation through the use of a small river.

It is a second object of the present invention to provide a small-scale nonpolluting hydroelectric power generation apparatus that can be installed near a small river wherever there is a gentle gradient while having a minimum effect on the ecosystem of the small river.

It is a third object of the present invention to provide a compact hydropower generation apparatus that can achieve an efficient utilization of installation space while achieving minimum environmental disruption.

It is a fourth object of the present invention to provide a compact hydropower generation apparatus that can achieve a considerable reduction in use of fossil fuel and energy.

It is a fifth object of the present invention to provide a compact hydropower generation system that can transmit sufficient power to a generator even when the peripheral area around a small river has no gradient, and can achieve great power in spite of a relatively small overall size thereof.

It is a sixth object of the present invention to provide a compact hydropower generation system using a plurality of rotary drums that can achieve an improvement in product quality and reliability.

In accordance with the present invention, the above and other objects can be accomplished by the provision of a compact hydropower generation apparatus using a plurality of rotary drums, comprising: a water reservoir for changing the flow direction of water that flows along a river and temporarily storing the water; a base body located at a lower side of the water reservoir and having a drainage way formed at an end of a downwardly inclined portion thereof; an upper closing member and a lower closing member provided at opposite sides of an upper end of the base body, the upper closing member being configured to communicate with the water reservoir, and the lower closing member being configured to communicate with the drainage way through a plurality of drain pipes; a power generating device located between the upper closing member and the lower closing member, such that if the water stored in the water reservoir is introduced thereinto through a plurality of water supply pipes, the power generating device rotates about a plurality of shafts to obtain power; and an accelerator and a generator coupled to the lower ends of the shafts.

DESCRIPTION OF THE PREFERRED EMBODIMENTS

Now, preferred embodiments of a compact hydropower generating apparatus using multiple rotary drums in accordance with the present invention will be explained with reference to FIGS. 2 through 12.

In the following description of the present invention, a detailed description of known functions and configurations incorporated herein will be omitted when it may make the subject matter of the present invention rather unclear.

Also, the terms used in the following description are terms defined taking into consideration the functions obtained in accordance with the present invention. The definitions of these terms should be determined based on the whole content of this specification because they may be changed in accordance with the preference of a manufacturer or a usual practice.

The compact hydropower generation apparatus using a plurality of rotary drums in accordance with the present invention is an apparatus designed to enable small-scale power generation using a small river while minimizing environmental disruption, and to achieve an efficient utilization of installation space. Also, the compact hydropower generation apparatus of the present invention has less impact on the ecosystem of the small river, and can be easily installed near the small river wherever there is a gentle gradient. Now, the detailed technical configuration of the present invention will be explained.

Figure 1:
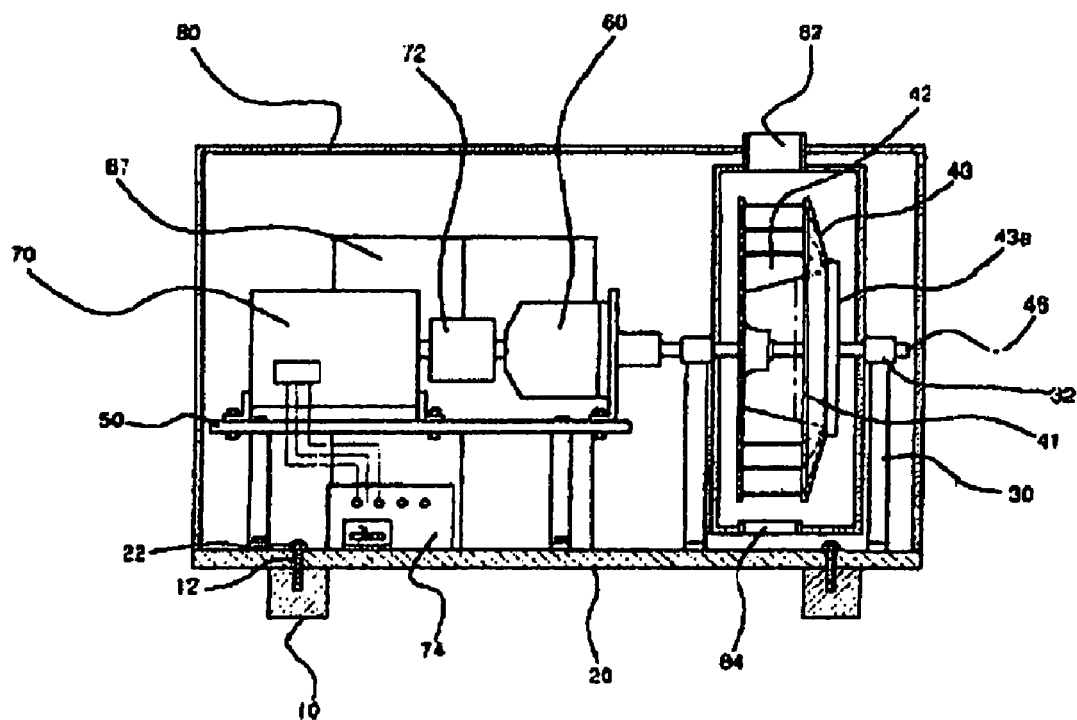
FIG. 1 is a sectional view showing the internal configuration of a conventional compact hydropower generation apparatus.
Figure 2:
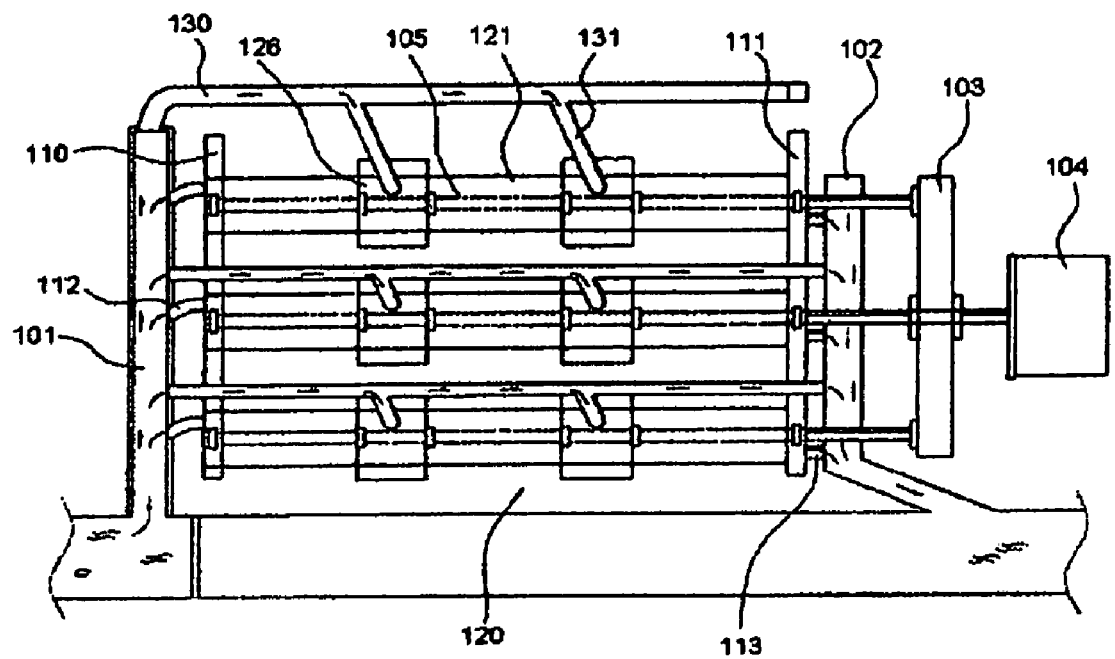
FIG. 2 is a plan view showing a compact hydropower generation apparatus using a plurality of rotary drums in accordance with an exemplary embodiment of the present invention.
Figure 3:
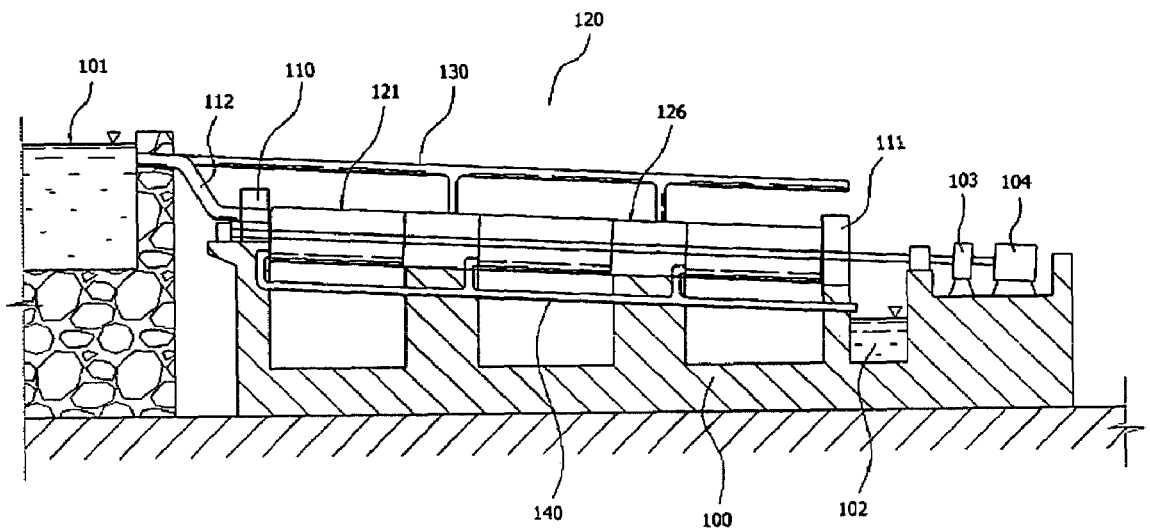
FIG. 3 is a front view of the compact hydropower generation apparatus of FIG. 2.

Referring to FIGS. 2 and 3, the compact hydropower generation apparatus of the present invention comprises a water reservoir 101 for changing the direction of water flowing along a river and for temporarily storing the water. Preferably, the water reservoir 101 has an elongated shape of a predetermined longitudinal length.

A base body 100 is located below and at one side of the water reservoir 101. The base body 100 is downwardly inclined away from the water reservoir 101, and a drainage way 102 is formed at a lower side region of the base body 100 opposite the water reservoir 101. Preferably, the drainage way 102 has a longitudinally elongated shape, and is connected at a distal end thereof to the river.

The base body 100 is provided at opposite sides of an upper end thereof with an upper closing member 110 and a lower closing member 111. The upper closing member 110 is configured to communicate with the water reservoir 101 through a plurality of water supply pipes 112, and the lower closing member 111 is configured to communicate with the drainage way 102 through a plurality of drain pipes 113.

A power generating device 120 is located between the upper closing member 110 and the lower closing member 111. If water stored in the water reservoir 101 is introduced into the power generating device 120 through the water supply pipes 112, the power generating device 120 is rotated about a plurality of shafts 105 by the potential energy of the flowing water, to obtain power. An accelerator 103 and a generator 104 are coupled to the lower ends of the shafts 105.

Figure 4:
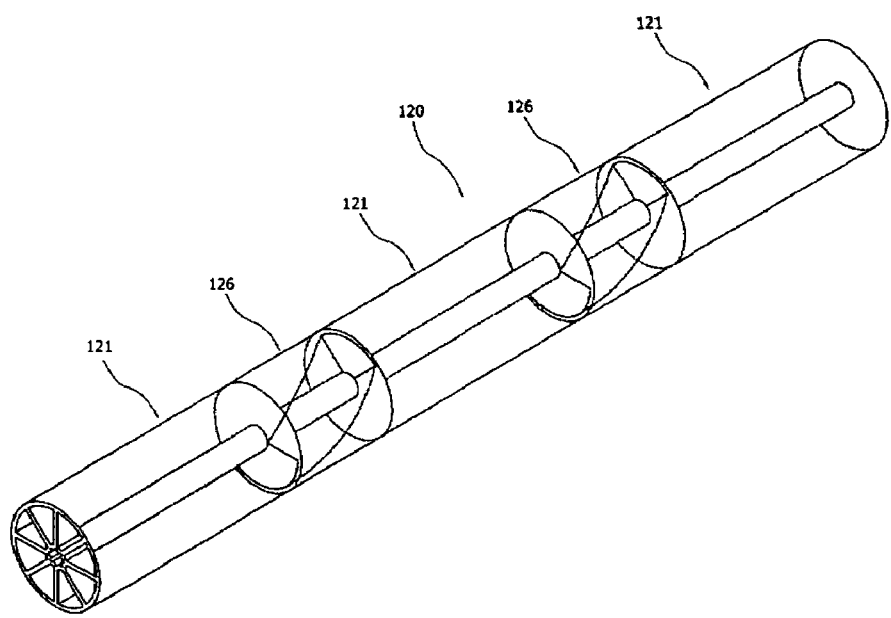
FIG. 4 is a perspective view showing the important part of a power generating device in accordance with the present invention.
Figure 5A:
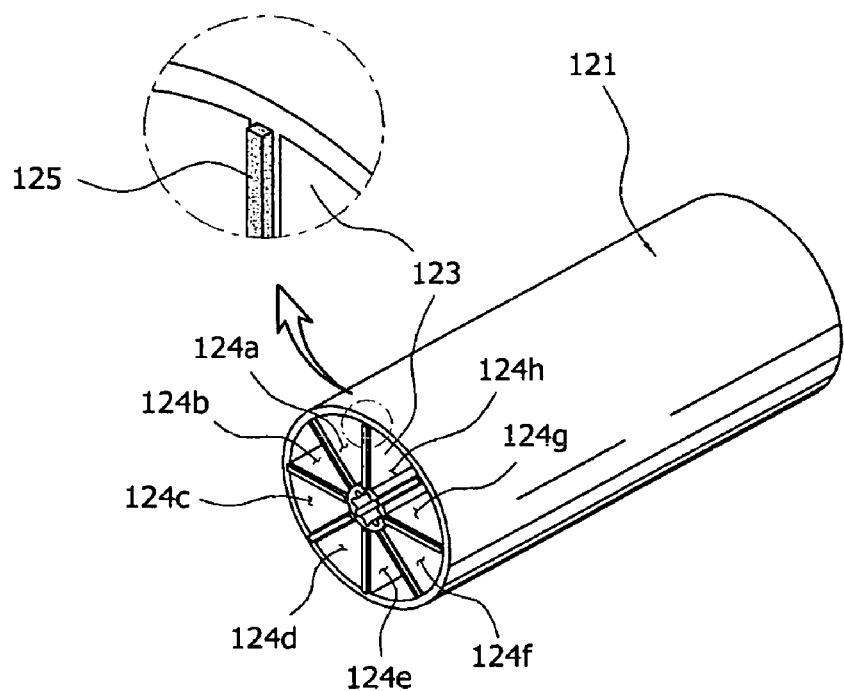
FIGS. 5A and 5B are a perspective view and a sectional view, respectively, showing the important part of a rotary drum in accordance with the present invention.
Figure 5B:
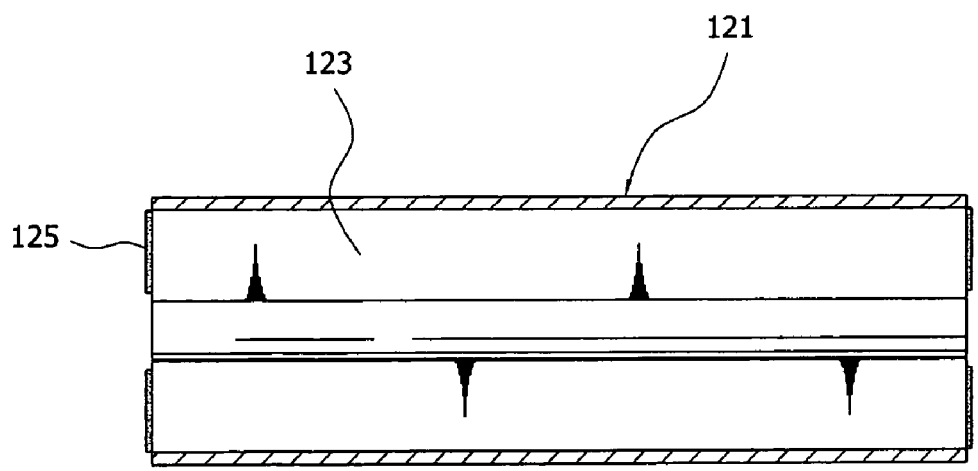
Figure 6A:
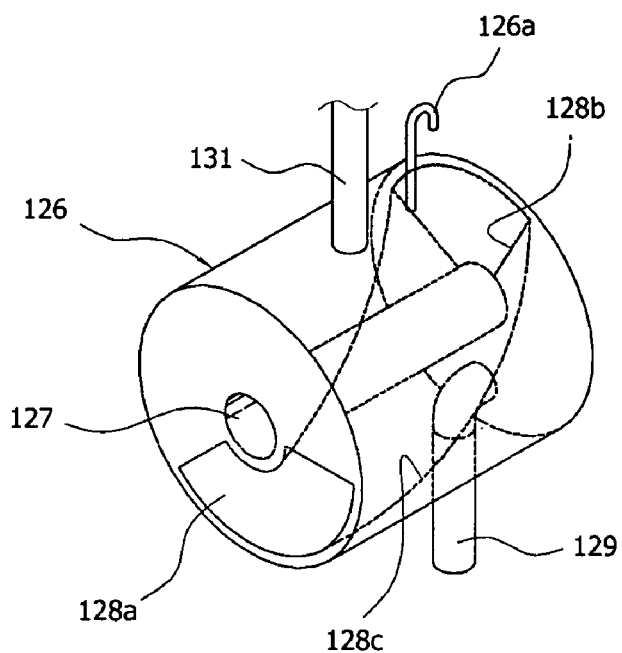
FIGS. 6A and 6B are a perspective view and a sectional view, respectively, showing the important part of a stationary drum in accordance with the present invention.
Figure 6B:
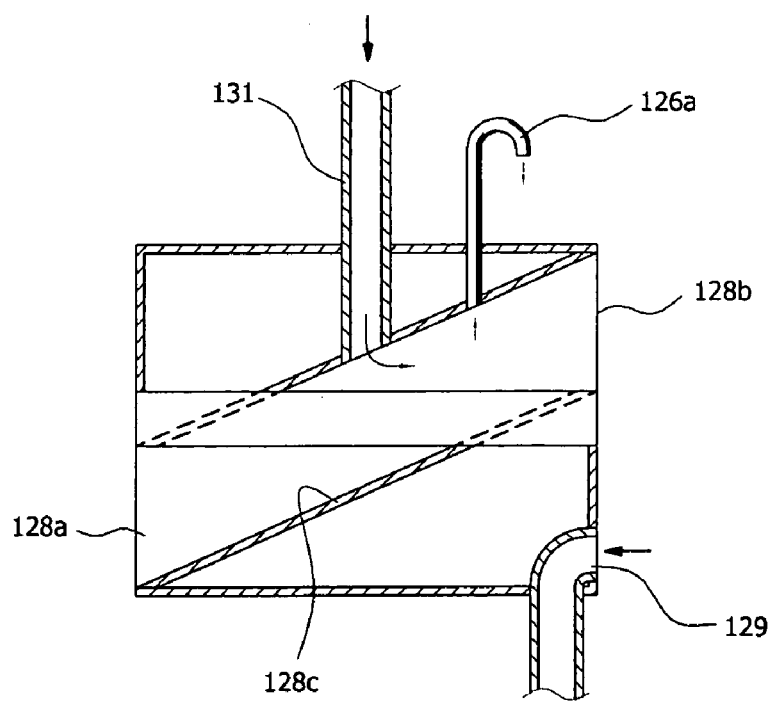
Figure 7A:
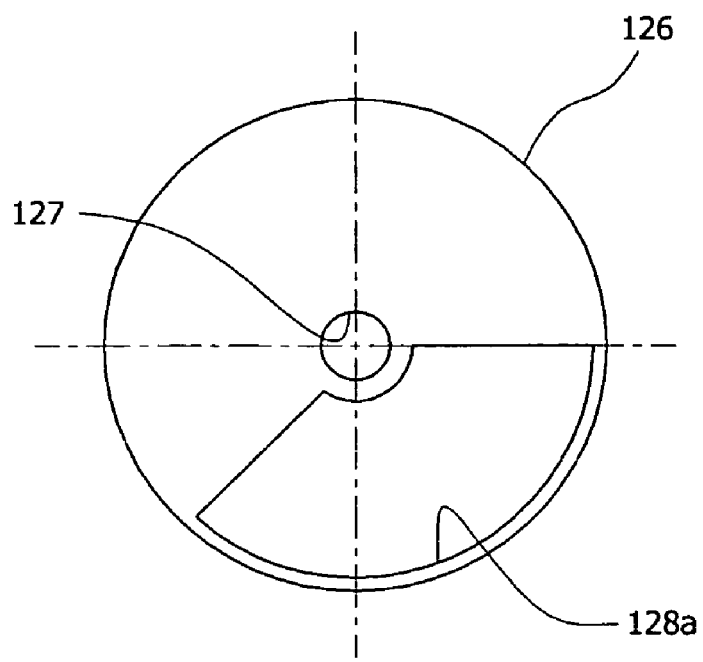
FIGS. 7A and 7B are a front view and a rear view, respectively, showing the stationary drum in accordance with the present invention.
Figure 7B:
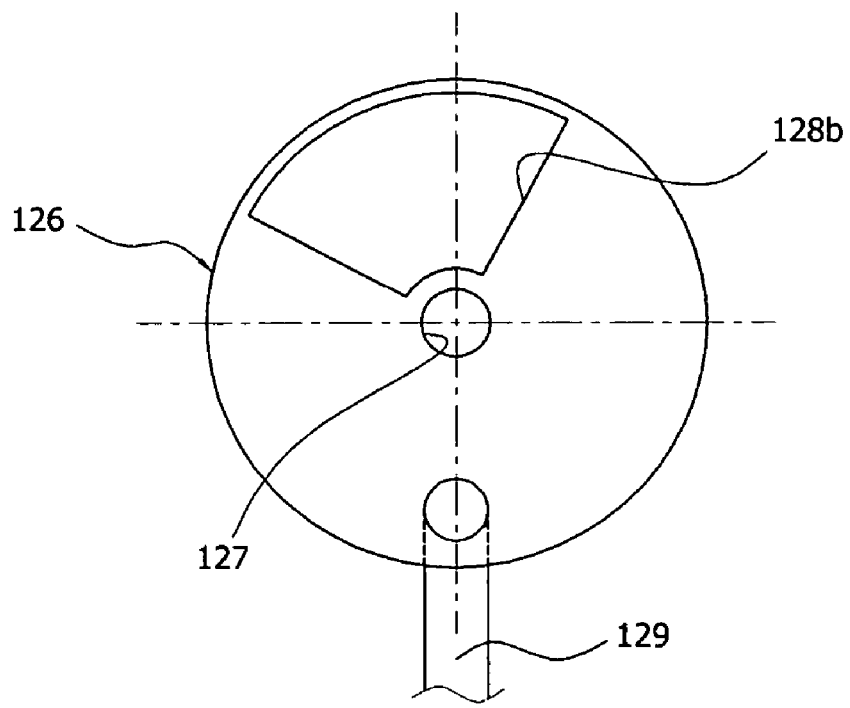

Referring to FIGS. 4, 5 and 6, the power generating device 120 includes a plurality of rotary drums 121, and a plurality of stationary drums 126, which are arranged in a plurality of rows. Each of the rotary drums 121 is provided with a plurality of partitions 123 about a shaft bore 122 thereof, into which one of the shafts 105 is inserted. The configuration of the partitions 123 defines a plurality of spaces 124a, 124b, 124c, 124d, 124e, 124f, 124g, and 124h. Although eight spaces are shown in the drawing, it can be appreciated that the number of the spaces is freely adjustable as occasion demands.

Each of the stationary drums 126 has a central shaft bore 127, into which one of the shafts 105 is inserted. Both ends of the stationary drum 126 are closed except for an inlet hole 128a and an outlet hole 128b, respectively. Basically, one of the rotary drums 121 and one of the stationary drums 126 are successively arranged at a side of the upper closing member 110, and the lower closing member 110 is connected to another rotary drum 121.

In the present invention, it is important that the inlet hole 128a is larger than the outlet hole 128b, and a passage 128c is perforated through the stationary drum 126 to extend upward from the inlet hole 128a to the outlet hole 128b.

A plurality of supplementary water pipes 130 are connected to the water reservoir 101 to extend along the power generating device 120. Each of the supplementary water pipes 130 has a plurality of connection pipes 131, which are connected to the stationary drums 126, so as to supply water into the passages 128c, respectively.

Each of the stationary drums 126 is provided with a ventilation nozzle 126a configured to communicate with the passage 128c.

The stationary drum 126 is also provided at a lower end of one side thereof with a water discharge nozzle 129 to communicate with a water discharge pipe 140. Here, a plurality of water discharge pipes 140 is located below the power generating device 120.

As shown in FIG. 5, the partition 123, which is provided at either end of each of the rotary drums 121, is provided with a packing seal 125 for preventing the leakage of water. Also, a bearing is rotatably interposed between the rotary drum 121 and the adjacent stationary drum 126 to prevent the leakage of water into an inter-connecting region therebetween.

The power generating device 120 in accordance with the present embodiment may be arranged in series or in parallel about the water reservoir 101 in consideration of the desired generation capacity.

Now, the operation and effects of the above-described compact hydropower generation apparatus using the plurality of rotary drums in accordance with the present invention will be explained.

Referring to FIGS. 2 and 3, first, river water is gathered into the water reservoir 101. After the water fills the water reservoir 101, it is naturally introduced into the power generating device 120 through the water supply pipes 112, thereby serving to generate power.

As stated above, the power generating device 120 includes the rotary drums 121 and stationary drums 126 arranged about the shafts 105. With this configuration, if the water is introduced into the rotary drums 121, the rotary drums 121 are rotated along with the shafts 105, and simultaneously, the rotating shafts 105 act to drive the accelerator 103 and generator 104 connected to the lower ends thereof, resulting in the generation of electric power. It should be noted that the plurality of rows constituting the power generating device 120 are identical in operation, and therefore, the following description deals with only one row of the power generating device 120.

First, the water, having passed through the water supply pipe 112, is initially introduced into the foremost rotary drum 121. During this initial water introduction, the water is concentrated in and fills three of the spaces 124a, 124b, and 124c of the partition 123 located at the entrance of the foremost rotary drum 121. As a result, the foremost rotary drum 121 is rotated along with the shaft 105 by the potential energy of the collected water, thereby causing the three spaces 124a, 124b, and 124c to be displaced downward. At the same time as the downward displacement of the spaces 124a, 124b, and 124c, the water is introduced into the following three spaces 124d, 124e, and 124f, and the water that passed through spaces 124a, 124b, and 124c flows into the downstream adjacent stationary drum 126, so as to be introduced into the passage 128c through the inlet hole 128a. Then, if the water is discharged from the outlet hole 128b, the water is again introduced into three of the spaces 124a, 124b, and 124c of the downstream adjacent rotary drum 121. As the above described procedure is repeated, the plurality of rotary drums 121 are rotated along with the shaft 105, and the stationary drums 126 remain in a fixed state while allowing the water to be introduced into the passages 128c thereof.

In the present embodiment, the reason why the outlet hole 128b is smaller than the inlet hole 128a is to ensure that a large amount of water can be easily introduced through the larger inlet hole 128a while allowing the large amount of water to be discharged through the smaller outlet hole 128b at an increased velocity. This has the advantageous effect of allowing the water to be introduced into the rotary drum 121, which is located downstream of the corresponding stationary drum 126, with a high momentum, so as to achieve an increase in rotation force of the rotary drum 121.

Also, in case an insufficient amount of water passes through the passages 128c, supplemental water is provided. For this, the water stored in the water reservoir 101 fills the supplementary water pipe 130, such that the water is introduced into the passages 128c of the stationary drums 126 through the connection pipes 131 connected to the supplementary water pipe 130, to supply the necessary additional water.

As another advantageous effect of the present embodiment, through the ventilation nozzles 126a connected to the passages 128c of the stationary drums 126, an efficient discharge of air can be accomplished.

Furthermore, if an unnecessary amount of water remains after the water passes through the passages 128c, the extra water is discharged from the stationary drums 126 through the water discharge nozzles 129 connected to the lower end of one side of each stationary drum 126. The water, having passed through the water discharge nozzles 129, is discharged into the drainage way 102 through the water discharge pipe 140.

Meanwhile, when the rotary drum 121 is rotated in contact with the stationary drum 126, the present invention ensures that the water is introduced into only the inlet hole 128a by passing through the spaces 124a to 124h without risk of leakage. This is possible since the packing seal 125, which protrudes from either partition 123 of the rotary drum 121, comes into close contact with the closed end surface of the stationary drum 126 during rotation.

In the present embodiment, since the rotary drums 121 and stationary drums 126 are successively arranged in a longitudinal direction at a relatively long distance, and are slightly inclined downward, the power generating device 120 is able to achieve a large rotation force and power. Also, by arranging the power generating device 120 in series or in parallel, the overall size of the power generating device 120 is adjustable in consideration of the desired power generation capacity and given circumstances.

Accordingly, by use of the accelerator 103 and the generator 104 which are mounted at a lowermost or uppermost end of the power generating device 120, the desired electric power can be generated.

Figure 8:
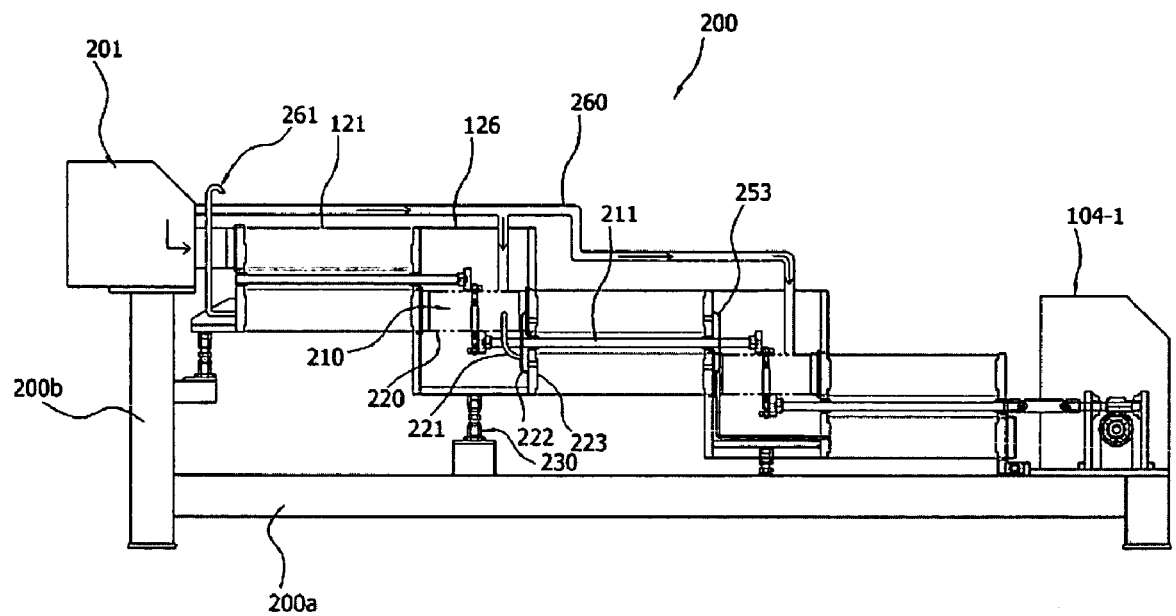
FIG. 8 is a front view showing a compact hydropower generation apparatus using a plurality of rotary drums in accordance with another embodiment of the present invention.
Figure 9:
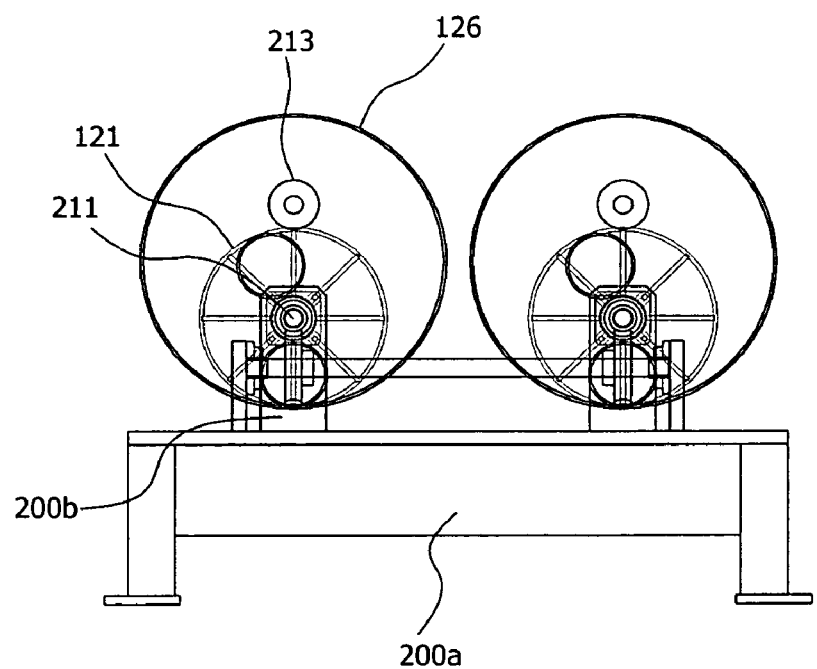
FIG. 9 is a side view showing a compact hydropower generation apparatus of FIG. 8.

FIGS. 8 to 12 illustrate another embodiment of the compact hydropower generation apparatus in accordance with the present invention. As shown in FIG. 8, a power generating device 200 of the present embodiment has a multiple layer structure wherein the plurality of rotary drums 121 and the plurality of stationary drums 126 are horizontally arranged in multiple layers.

Specifically, the power generating device 200 of the present embodiment includes: a horizontal supporting panel 200a having a longitudinally elongated shape and provided at a side of an upper surface thereof with a generator 104-1; and a plurality of vertical supporting posts 200b provided at an upper end thereof with a water supply tank 201. The plurality of rotary drums 121 and stationary drums 126 are successively arranged at a side of the water supply tank 201, such that a plurality of shafts 211, each penetrating through the center of the respective rotary drums 121, are horizontally arranged in multiple layers. For the installation of the shafts 211 as stated above, a plurality of power transmission units 210 are used. Each of the stationary drums 126 is centrally provided with a connection pipe 220 to transfer water from one rotary drum 121, located at a side thereof, to another rotary drum 121 located at the other side thereof.

Although the power generating device 200 of the present embodiment has a three layer structure, it will be appreciated that the present invention is not limited thereto, and the power generating device 200 may have a two layer structure, or a four or more layer structure.

Figure 10:
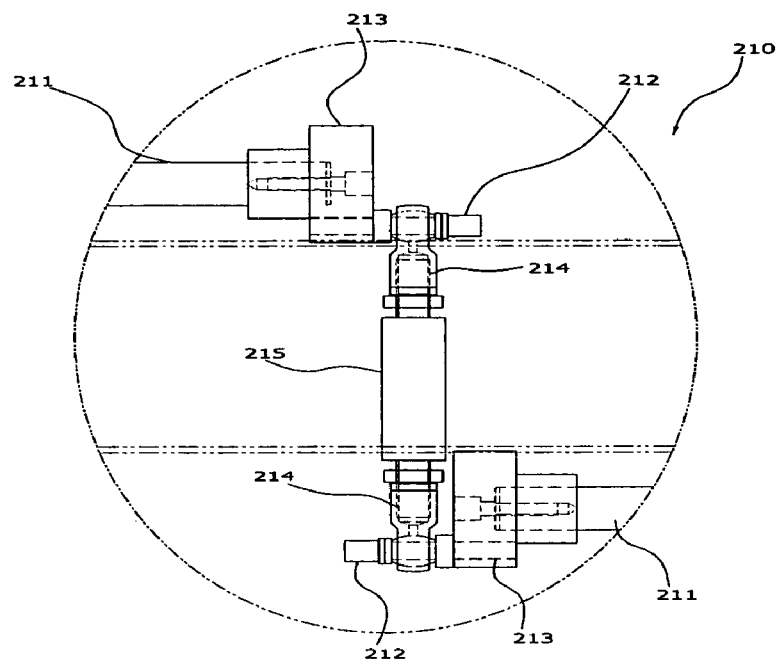
FIG. 10 is an enlarged front view showing an important part of a power transmission unit provided in the compact hydropower generation apparatus of FIG. 8.

As shown in FIG. 10, the power transmission units 210 in accordance with the present embodiment are located at facing ends of the upper and lower shafts 211 which are arranged in multiple layers. Each of the power transmission units 210 includes: a pair of closing members 213 provided at the ends of the upper and lower shafts 211; a pair of hinge shafts 212 protruding outward from the closing members 213 toward each other; a pair of vertical connecting rods 214 fastened to the hinge shafts 212 and perpendicular thereto, the vertical connecting rods 214 being internally threaded; and a link 215 fastened at upper and lower ends thereof to both the upper and lower connecting rods 214 and externally threaded.

Alternatively, although not shown, the power transmission unit 210 may include chains, gears, or combinations thereof located between the upper and lower shafts 211, to achieve the transmission of power.

In the present embodiment, furthermore, a plurality of levelers 230 are provided between the horizontal supporting panel 200a and the power generating device 200 and between the vertical supporting posts 200b and the power generating device 200, to keep the power generating device 200 horizontal. Each of the levelers 230 is threaded.

Each of the rotary drums 121 is provided at an entrance thereof with an upper supply unit 240, to facilitate the initial rotation of the rotary drum via a rapid water supply. Also, a lower discharge unit 250 is formed at an exit of the rotary drum 121, to ensure rapid water discharge when the operation of the power generating device 200 is completely stopped or temporarily stopped for the repair thereof.

Figure 11:
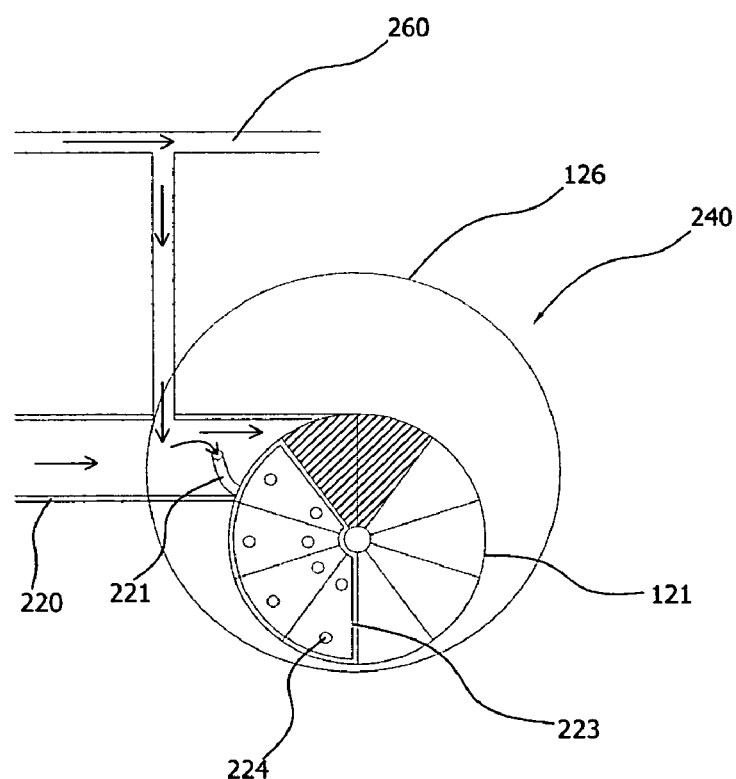
FIG. 11 is a side view showing the important part of an upper supply unit employed in the compact hydropower generation apparatus of FIG. 8.

As shown in FIG. 11, the upper supply unit 240 includes: an auxiliary water supply nozzle 221 that protrudes into the connection pipe 220 to discharge a constant amount of water; a cover 222 connected to an end of the auxiliary water supply nozzle 221 and configured to close the entrance of the rotary drum 121; and a casing 223 connected to the stationary drum 126 and having a plurality of through-holes 224 uniformly arranged at a constant distance to gradually introduce the water, supplied from the auxiliary water supply nozzle 221, into the rotary drum 121.

Figure 12:
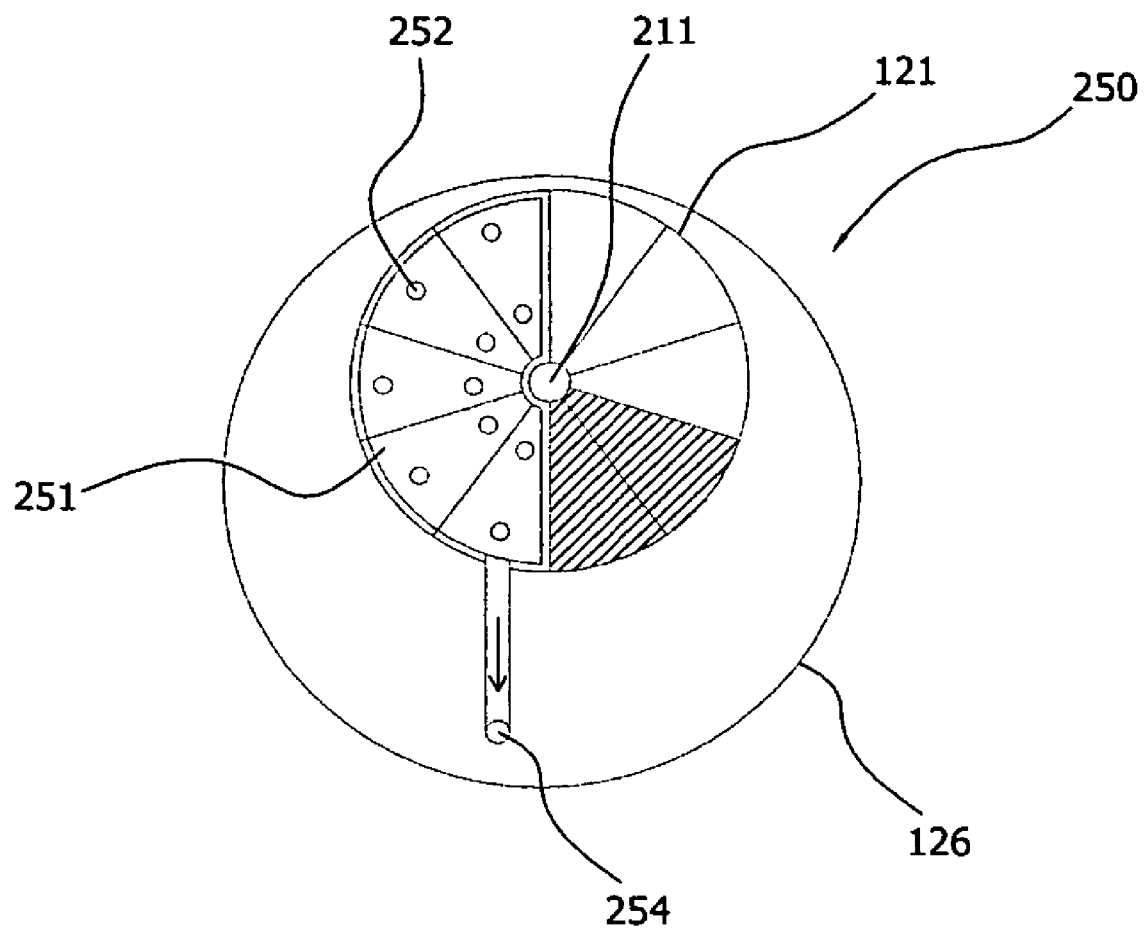
FIG. 12 is a side view showing the important part of a lower discharge unit employed in the compact hydropower generation apparatus of FIG. 8.

As shown in FIG. 12, the lower discharge unit 250 includes: a casing 251 connected to the stationary drum 126 and configured to close half of the rotary drum 121, the casing 251 having a plurality of through-holes 252 uniformly arranged at a constant distance; a cover 253 provided at an end of the casing 251 and configured to close the exit of the rotary drum 121; and an auxiliary drain nozzle 254 provided at a lower end of the cover 253 and having a drain valve to discharge water downstream into the adjacent rotary drum 121.

In the present embodiment, a plurality of supplementary water pipes 260 is connected to the water supply tank 201 to supply water to the respective connection pipes 220.

Each of the rotary drums 121 is provided with a ventilation nozzle 261 to communicate with the outside.

Now, the operation and effects of the compact hydropower generation apparatus having the above-described configuration in accordance with another embodiment of the present invention will be explained. It should be noted that the following description assumes that each layer of the multi-layered power generating device 200 includes one rotary drum 121, one stationary drum 126, and one shaft 211.

First, river water is introduced into the water supply tank 201. Then, the water is introduced into the power generating device 200 located adjacent to the water supply tank 201, thereby serving to generate power.

With the power generating device 200 having the above described configuration, when the water is introduced into the uppermost rotary drum 121, the uppermost rotary drum 121 is rotated along with the shaft 211, and simultaneously, the rotating shaft 211 acts to rotate another rotary drum 121 and shaft 211, which are located right below the first set of drums, via the power transmission unit 210, resulting in the generation of electric power through the operation of the generator 104-1.

More specifically, when the water, discharged from the water supply tank 201, is introduced into the uppermost rotary drum 121, the uppermost rotary drum 121 is rotated, and simultaneously, the shaft 211, which penetrates through the uppermost rotary drum 121, is rotated.

As the uppermost rotary drum 121 and shaft 211 rotate together, the power transmission unit 210, connected at the upper end thereof to the shaft 211, is operated, thereby causing another shaft 211 connected to the lower end of the power transmission unit 210 to rotate. Thereby, through the rotation of the power transmission unit 210, the lower rotary drum 121 and shaft 211 are rotated.

Specifically, if the uppermost shaft 211 is rotated, the closing member 213 and hinge shaft 212, which are fixed to the end of the uppermost shaft 211, rotate together. In this case, since the hinge shaft 212 is connected to the connecting rod 214 that is fastened to the upper end of the link 215, the link 215 is rotated. Thereby, the hinge shaft 212 and closing member 213, which are connected to the lower end of the link 215 via the connecting rod 214, are simultaneously rotated, resulting in the simultaneous rotation of the shaft 211 that is located right below the uppermost shaft 211. In this way, the plurality of power transmission units 210 are successively driven, achieving an effective operation of the power generating device 200 having a three or more layer structure.

Although not shown, the power transmission unit 210 may be configured to rotate the shaft 211 via the interaction of a chain, chain gear, and drive gear, instead of using the link 215.

The water that is discharged from one rotary drum 121, is introduced into another downstream rotary drum 121 through the connection pipe 220. In this case, the upper supply unit 240, provided at the entrance of the downstream rotary drum 121, allows the water to be rapidly supplied into the downstream rotary drum 121 upon initial rotation of the rotary drum 121.

Specifically, as shown in FIG. 11, the water that is discharged from the connection pipe 220, is concentrated into the portion of the rotary drum 121 that is marked in the figure with oblique lines, thereby allowing a rapid rotation of the rotary drum 121. Such a concentrated water introduction is possible since the casing 223 closes one third of the entrance of the rotary drum 121. In this case, the casing 223 also allows a small amount of water to be gradually introduced into the rotary drum 121 through the through-holes 224, thereby eliminating the risk of water leakage out of the cover 222.

Also, as shown in FIG. 12, when the operation of the power generating device 200 is completely stopped or temporarily stopped for the repair thereof, the lower discharge unit 250 serves to ensure efficient drainage of water.

Specifically, the water to be discharged is concentrated into the portion of the rotary drum 121 that is marked with oblique lines by the casing 251 that closes half of the exit of the rotary drum 121. Also, a small amount of water is able to be gradually discharged from the rotary drum 121 through the through-holes 252 formed at the casing 251. This has the effect of eliminating the risk of water leakage out of the cover 253.

In the present embodiment, the auxiliary drain nozzle 254, which is formed with the drain valve, is provided at the lower end of the cover 253, so as to introduce water into the rotary drum 121. Accordingly, when a great amount of water passes through the cover 253, the water is able to be directly introduced into the downstream rotary drum 121 through the auxiliary drain nozzle 254.

Meanwhile, when an insufficient amount of water is introduced into the power generating device 200, the water is able to be supplied directly into the connection pipes 220 through the supplementary water pipes 260. Also, when a great amount of water is introduced into the rotary drums 121, the ventilation nozzles 261 act to discharge air to the outside, and therefore, are able to prevent malfunction due to overload.

As apparent from the above description, the present invention provides a compact hydropower generation apparatus having several effects. For example, with the compact hydropower generation apparatus using a plurality of rotary drums in accordance with the present invention, small-scale power generation utilizing a small river is possible, and a small-scale nonpolluting hydroelectric power generating device, which can be installed around a small river wherever there is a gentle gradient, can be accomplished while having a minimum effect on the ecosystem of the small river. Further, it is possible to achieve an efficient utilization of installation space while achieving minimal environmental disruption, and to achieve a considerable reduction in use of fossil fuel and energy. Also, even when the peripheral area around the small river has no inclination, it is possible to transmit a great amount of power to the generator thereof by use of waterpower, and to achieve a great amount of power in spite of the relatively compact overall size thereof, resulting in an improvement in product quality and reliability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A compact hydropower generation apparatus using a plurality of rotary drums, comprising:
    a water reservoir for changing the flow direction of water that flows along a river and temporarily storing the water,
    a base body located at a lower side of the water reservoir and having a drainage way formed at one end of a downwardly inclined portion thereof,
    an upper closing member and a lower closing member provided at opposite sides of an upper end of the base body, the upper closing member being configured to communicate with the water reservoir, and the lower closing member being configured to communicate with the drainage way through a plurality of drain pipes,
    a power generating device located between the upper closing member and the lower closing member that, when the water stored in the water reservoir is introduced thereinto through a plurality of water supply pipes, rotates about a plurality of shafts due to the potential energy of the water to obtain power, and
    an accelerator and a generator coupled to the lower ends of the shafts,
    wherein said power generating device includes a plurality of rotary drums, and a plurality of stationary drums, wherein each of the rotary drums is provided with a plurality of partitions about a shaft bore thereof, into which one of the shafts is inserted, each partition being divided to define a plurality of spaces, wherein each of the stationary drums has a central shaft bore, into which one of the shafts is inserted, both ends of the stationary drum being closed except for an inlet hole and an outlet hole, and wherein one of the rotary drums and one of the stationary drums are successively arranged at a side of the upper closing member, and the lower closing member is connected to another rotary drum.

2. The apparatus as set forth in claim 1, wherein the inlet hole is larger than the outlet hole, and a passage is provided through the stationary drum to extend upward from the inlet hole to the outlet hole.

3. The apparatus as set forth in claim 1, wherein a plurality of supplementary water pipes are connected to the water reservoir, and each of the supplementary water pipes has a plurality of connection pipes, which are connected to the stationary drums, so as to supply the water stored in the water reservoir into the passages.

4. The apparatus as set forth in claim 1, wherein each of the stationary drums is provided with a ventilation nozzle configured to communicate with the passage of the stationary drum.

5. The apparatus as set forth in claim 1, wherein each of the stationary drums is provided at a lower end of one side thereof with a water discharge nozzle to communicate with a water discharge pipe.

6. The apparatus as set forth in claim 1, wherein the partition, which is provided at either end of each of the rotary drums, is provided with a packing seal for preventing the leakage of water.

7. The apparatus as set forth in claim 1, wherein the power generating device is arranged in series or in parallel about the water reservoir based on the desired generation capacity.

8. The apparatus as set forth in claim 1, wherein the power generating device has a multiple layer structure in which the plurality of rotary drums and the plurality of stationary drains are horizontally arranged in multiple layers.

9. The apparatus as set forth in claim 8, wherein the power generating device includes:
- a horizontal supporting panel having a longitudinally elongated shape and provided at a side of an upper surface thereof with a generator, and a plurality of vertical supporting posts provided at an upper end thereof with a water supply tank,
- a plurality of power transmission units having a plurality of shafts, which are horizontally arranged in multiple layers, to penetrate through the center of the respective rotary drums, the rotary drums and the stationary drums being successively arranged at a side of the water supply tank, and
- a plurality of connection pipes provided in the center of the stationary drums, to transfer water from one rotary drum, located at a side thereof, to another rotary drum located at the other side thereof.

10. The apparatus as set forth in claim 9, wherein each of the power transmission units includes:
- a pair of closing members provided at facing ends of the upper and lower shafts, a pair of hinge shafts protruding outward from the respective closing members toward each other,
- a pair of vertical connecting rods fastened to the hinge shafts and perpendicular thereto, the vertical connecting rods being internally threaded, and
- a link fastened at upper and lower ends thereof, to both the upper and lower connecting rods and externally threaded.

11. The apparatus as set forth in claim 10, wherein the power transmission unit further includes one feature selected from among a chain, chain gear, or gear, between the upper and lower shafts for the transmission of power.

12. The apparatus as set forth in claim 9, wherein a plurality of levelers are provided between the horizontal supporting panel and the power generating device and between the vertical supporting posts and the power generating device, to keep the power generating device horizontal, each leveler being threaded.

13. The apparatus as set forth in claim 8, wherein each of the rotary drums is provided at an entrance thereof with an upper supply unit to facilitate the initial rotation of the rotary drum via a rapid water supply, and at an exit thereof with a lower discharge unit to ensure rapid water discharge when the operation of the power generating device is completely stopped or temporarily stopped for the repair thereof.

14. The apparatus as set forth in claim 13, wherein the upper supply unit includes:
- an auxiliary water supply nozzle that protrudes into the connection pipe to discharge a constant amount of water,
- a cover connected to an end of the auxiliary water supply nozzle and configured to close the entrance of the rotary drum, and
- a casing connected to an associated stationary drum and having a plurality of through-holes uniformly arranged at a constant distance to gradually introduce the water supplied from the auxiliary water supply nozzle into the rotary drum.

15. The apparatus as set forth in claim 13, wherein the lower discharge unit includes:
- a casing connected to an associated stationary drum and configured to close half of the rotary drum, the casing having a plurality of through-holes uniformly arranged at a constant distance,
- a cover provided at an end of the casing and configured to close the exit of the rotary drum, and
- an auxiliary drain nozzle provided at a lower end of the cover and having a drain valve to discharge water downstream into the adjacent rotary drum.

16. The apparatus as set forth in claim 8, wherein a plurality of supplementary water pipes are connected to the water supply tank to supply water to connection pipes that are provided in the stationary drums.

17. The apparatus as set forth in claim 8, wherein each of the rotary drums is provided with a ventilation nozzle to communicate with the outside.

* * * * *